(12) United States Patent
Knübel

(10) Patent No.: US 11,618,547 B2
(45) Date of Patent: Apr. 4, 2023

(54) SPAR JOINT AND AERODYNAMIC BOX AND AIRFOIL PROFILE USING THE SAME

(71) Applicant: Airbus Operations GmbH, Hamburg (DE)

(72) Inventor: Mark Knübel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 102 days.

(21) Appl. No.: 17/185,173

(22) Filed: Feb. 25, 2021

(65) Prior Publication Data

US 2021/0347464 A1 Nov. 11, 2021

(30) Foreign Application Priority Data

Feb. 28, 2020 (DE) .......................... 102020105329.0

(51) Int. Cl.
- *B64C 3/26* (2006.01)
- *B64C 3/28* (2006.01)
- *B64C 3/18* (2006.01)

(52) U.S. Cl.
CPC .............. *B64C 3/26* (2013.01); *B64C 3/185* (2013.01); *B64C 3/28* (2013.01)

(58) Field of Classification Search
CPC .............. B64C 3/28; B64C 3/26; B64C 3/185
See application file for complete search history.

(56) References Cited

U.S. PATENT DOCUMENTS

| | | | |
|---|---|---|---|
| 10,011,345 B2 * | 7/2018 | Fong | B29C 70/222 |
| 10,569,859 B2 | 2/2020 | Everaert et al. | |
| 2006/0249626 A1 * | 11/2006 | Simpson | B64C 3/20 244/123.1 |
| 2016/0176500 A1 * | 6/2016 | Ross | B29D 99/0014 428/157 |
| 2020/0086969 A1 | 3/2020 | Abadi | |
| 2020/0130807 A1 | 4/2020 | Peacock et al. | |

FOREIGN PATENT DOCUMENTS

| | | |
|---|---|---|
| EP | 3231702 A1 | 10/2017 |
| EP | 3623278 A1 | 3/2020 |
| EP | 3643599 A1 | 4/2020 |
| WO | 2014170690 A1 | 10/2014 |

OTHER PUBLICATIONS

German Search Report; priority document.

* cited by examiner

*Primary Examiner* — Timothy D Collins
*Assistant Examiner* — Eric Acosta
(74) *Attorney, Agent, or Firm* — Greer, Burns & Crain, Ltd.

(57) ABSTRACT

In order to integrate an aerodynamic box without a solid shim, a spar joint is provided. The spar joint comprises a first spar having a first spar contact surface and a second spar having a second spar contact surface. When the first and second spars are fixed to each other, the first and second contact surfaces engage each other in a manner forming a contact plane. The first and second contact surfaces are inclined such that a first imaginary plane that is an extension of the contact plane in a chordwise direction forms at least one intersection with a second imaginary plane that is originating from a chordwise extremal end of an aerodynamic skin. The spar joint is used in aerodynamic boxes, such as flap boxes and TE boxes. The spar joint is also used in airfoil profiles.

18 Claims, 2 Drawing Sheets

SPAR JOINT AND AERODYNAMIC BOX AND AIRFOIL PROFILE USING THE SAME

CROSS-REFERENCES TO RELATED APPLICATIONS

This application claims the benefit of the German patent application No. 102020105329.0 filed on Feb. 28, 2020, the entire disclosures of which are incorporated herein by way of reference.

FIELD OF THE INVENTION

The invention relates to a spar joint. Furthermore, the invention relates to an aerodynamic box and an airfoil profile using the spar joint or parts of it.

BACKGROUND OF THE INVENTION

Currently, a design gap is provided between the flap box and the trailing edge box. The gap allows compensation of tolerances by means of using solid shims. However, this concept is time intensive. Especially on high manufacturing rate types of aircraft, there is a need for a simpler solution.

SUMMARY OF THE INVENTION

It is an object of the invention to reduce the time and cost involved in manufacturing airfoil profiles.

The invention provides a spar joint configured for joining a first aerodynamic box and a second aerodynamic box so as to form an airfoil profile of an aircraft, the first aerodynamic box having a first aerodynamic skin, the second aerodynamic box having a second aerodynamic skin, wherein the spar joint comprises a first spar having at least one first spar contact surface configured for engaging another spar contact surface; a second spar having at least one second spar contact surface configured such that, when the first and second spars are fixed to each other, the first and second contact surfaces engage each other in a manner forming a contact plane, wherein the first and second contact surfaces are inclined in such a manner that a first imaginary plane that is an extension of the contact plane in a chordwise direction forms at least one intersection with a second imaginary plane that is originating from a chordwise extremal end of the first aerodynamic skin and/or the second aerodynamic skin.

Preferably, the first and second spar contact surfaces are inclined such that the intersection is positioned further outward relative to the position of the first and second spar contact surfaces.

Preferably, the first and second spars contact surfaces are inclined such that the intersection is positioned further forward relative to the position of the first and second spar contact surfaces.

Preferably, the first contact surface is inclined towards aft in the chordwise direction. Preferably, the second contact surface is inclined towards front in the chordwise direction.

Preferably, the first spar includes an upper first spar contact surface that is facing upward and a lower first spar contact surface that is facing downward. Preferably, the upper first spar contact surface is inclined towards aft in the chordwise direction. Preferably, the lower first spar contact surface is inclined towards aft in the chordwise direction.

Preferably, the second spar includes an upper second spar contact surface that is facing downward and a lower second spar contact surface that is facing upward. Preferably, the upper second spar contact surface is inclined towards front in the chordwise direction. Preferably, the lower second spar contact surface is inclined towards front in the chordwise direction.

Preferably, the first spar includes at least one first leg portion that is protruding towards aft in the chordwise direction. Preferably, the first spar contact surface is disposed on the first leg portion. Preferably, the first spar includes an upper first leg portion and a lower first leg portion that are spaced in the vertical direction. Preferably, the upper first spar contact surface is disposed on the upper first leg portion. Preferably, the lower first spar contact surface is disposed on the lower first leg portion.

Preferably, the second spar includes at least one second leg portion that is protruding towards aft in the chordwise direction. Preferably, the second spar contact surface is disposed on the second leg portion. Preferably, the second spar includes an upper second leg portion and a lower second leg portion that are spaced in the vertical direction. Preferably, the upper second spar contact surface is disposed on the upper second leg portion and the lower second spar contact surface is disposed on the lower second leg portion.

Preferably, the first spar includes a first intermediate portion that is integrally formed with the upper and lower first leg portions. Preferably, the first intermediate portion is arranged to be vertical. Preferably, the second spar includes a second intermediate portion that is integrally formed with the upper and lower second leg portions. Preferably, the second intermediate portion is arranged to be vertical.

Preferably, the first spar and the second spar define a cavity therebetween. Preferably, the cavity is defined by the first leg portion. Preferably, the cavity is defined by the upper and lower first leg portions. Preferably, the cavity is defined by the first intermediate portion. Preferably, the cavity is defined by the second leg portion. Preferably, the cavity is defined by the upper and lower second leg portions. Preferably, the cavity is defined by the second intermediate portion.

Preferably, the first spar includes at least one first collateral surface that is facing inward and is inclined such that, when the first and second spars are fixed to each other, the first collateral surface is parallel to the second aerodynamic skin arranged opposite of the first collateral surface. Preferably, the first spar includes an upper first collateral surface and a lower first collateral surface that are both facing inward and/or that are both facing each other. Preferably, the upper and lower first collateral surfaces are inclined such that, when the first and second spars are fixed to each other, the upper first collateral surface is parallel to an upper portion of the second aerodynamic skin arranged upward of the upper first collateral surface and/or the lower first collateral surface is parallel to a lower portion of the second aerodynamic skin arranged downward of the lower first collateral surface.

Preferably, the second spar includes at least one second collateral surface that is facing outward and is configured such that, when the first and second spars are fixed to each other, the second collateral surface is facing towards and parallel to the second aerodynamic skin. Preferably, the second spar includes an upper second collateral surface and a lower second collateral surface that are both facing outward. Preferably, the upper and lower second collateral surfaces are configured such that, when the first and second spars are fixed to each other, the upper second collateral surface is facing towards and is parallel to an upper portion of the second aerodynamic skin arranged upward of the upper second collateral surface and/or the lower second collateral surface is facing towards and is parallel to a lower portion of the second aerodynamic skin arranged downward of the lower second collateral surface.

Preferably, any combination of the first leg portions is tapered. Preferably, any combination of the second leg portions is tapered. Preferably, the taper is defined by the respective surfaces disposed on the respective leg portion.

Preferably, the first and second spars each comprise a fastener opening formed in the respective leg portions. Preferably, the fastener opening is configured for accommodating a fastener, so as to fix the first and second spars to teach other. Preferably, the fastener is a rivet.

The invention provides an aerodynamic box configured for forming an airfoil profile of an aircraft, the aerodynamic box comprising an aerodynamic skin and a spar that has at least one spar contact surface configured for engaging another spar, wherein the spar contact surface is inclined in such a manner that a first imaginary plane that is an extension of the spar contact surface in a chordwise direction forms at least one intersection with a second imaginary plane that is originating from a chordwise extremal end of the aerodynamic skin. The spar is preferably configured like any one of the first or second spars of the preferred spar joint.

Preferably, the aerodynamic box is configured as an airfoil box. Preferably, the aerodynamic box is configured as a flap box. Preferably, the aerodynamic box is configured as a trailing edge box.

The invention provides an airfoil profile configured for forming an aerodynamic surface of an aircraft, such as a high-lift device, a horizontal tail plane or a vertical tail plane, or a control surface, the airfoil profile comprising an airfoil box and a trailing edge box that are attachable to each other by means of a preferred spar joint and/or wherein the airfoil box and the trailing edge box are each formed as a preferred aerodynamic box.

Advantageous effects of the invention are subsequently described. It should be noted that not all advantageous effects need to be present at the same time or with the same intensity.

In a first example, the rear spar and auxiliary spar of a flap box and trailing edge box (also: TE box) had a contact surface parallel to the aerodynamic outer mold line. The angle between the two relevant surfaces is about 9° to 10°. A gap of 0.2 mm can be compensated in this case by moving the trailing edge box forward and aft in a direction of flight (ratio 1/5). This is the basic idea of shimless TE box integration and forms part of the invention. Both parts, i.e., rear spar and auxiliary spar, should be toleranced in advance to facilitate a similar behavior along the flap span. At the same time, tolerances should be as big as possible. One idea is to increase the ratio for tolerance compensation.

An improvement according to the invention suggests that the contact surfaces of the rear spar and auxiliary spar are inclined, so as to increase the ratio between gap/clash tolerance compensation. For example, a maximum angle of 22.5° may deliver a ratio of up to 1/2. Thus, during assembly, a TE box movement of ±1 mm could compensate a gap of up to 0.5 mm. A minimum value for the assembly gap, which does not need to be shimmed, may be 0.3 mm. As a result, a total gap of about 0.8 mm could be compensated.

If the fastener entry and exit side are configured in parallel, fastening is facilitated albeit at the cost of a small weight increase. However, this increase may be mitigated or even eliminated due to the lack of shims, which are superfluous in this configuration.

With this invention it is mainly possible to integrate TE boxes without solid shims, resulting in a plug-and-play TE box that is directly attachable to the flap box (or other similar boxes). Furthermore, tolerance compensation is improved due to a higher ratio. Still all aerodynamic step requirements are fulfilled and there is only a small weight impact, if any.

BRIEF DESCRIPTION OF THE DRAWINGS

Exemplary embodiments are described with reference to the attached drawings. As depicted in the drawings, the vertical direction is aligned along the up-down direction of the drawing, the chordwise direction is aligned along the left-right direction of the drawing and the spanwise direction is aligned orthogonally to the drawing sheet.

DETAILED DESCRIPTION OF THE PREFERRED EMBODIMENTS

Figure 1:
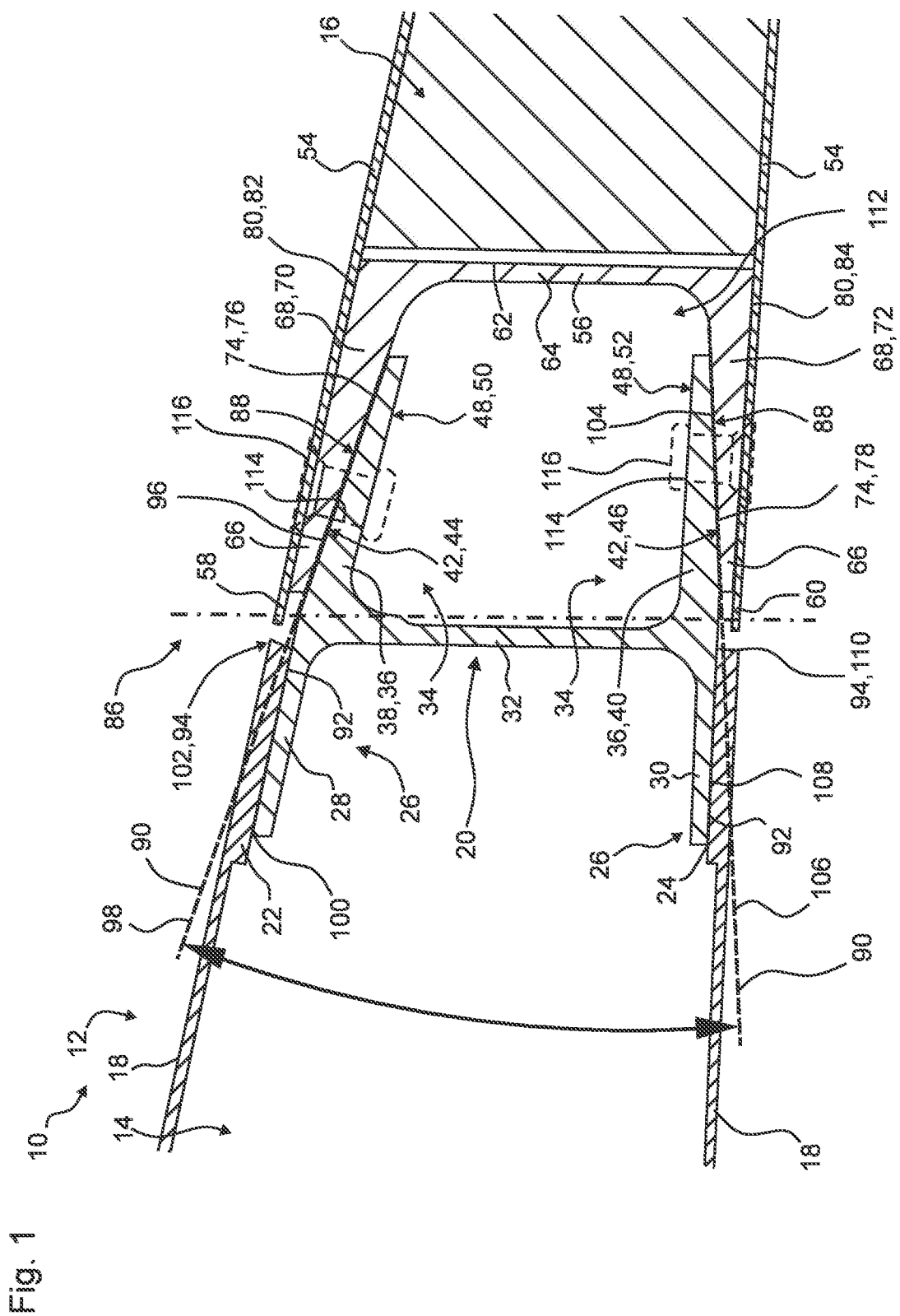
FIG. 1 partially depicts a cross-section through an airfoil profile according to the invention.

FIG. 1 depicts an airfoil profile 10. The airfoil profile 10 forms an aerodynamic surface 12 of an aircraft. The aerodynamic surface may be chosen among high-lift devices, such as flaps or slats, tail planes, such as vertical or horizontal tail planes, and control surfaces, such as elevators, rudders, ailerons, or any combination thereof, such as elevons and the like.

The airfoil profile 10 comprises a first aerodynamic box 14 and a second aerodynamic box 16.

The first aerodynamic box 14 generally forms the main body of the airfoil profile 10. Thus, for example, the first aerodynamic box 14 may be configured as a flap box.

The first aerodynamic box 14 includes a first aerodynamic skin 18 and a first spar 20. Preferably, the first spar 20 is configured as a rear spar that is facing towards aft in the chordwise direction of the airfoil profile 10.

The first aerodynamic skin 18 forms the outer surface of the first aerodynamic box 14 and is configured in a known manner according to aerodynamic requirements.

The first aerodynamic skin 18 includes an upper first end portion 22 and a lower first end portion 24. The first end portions 22, 24 are preferably configured to be attached to the first spar 20. The first end portions 22, 24 may be formed with a larger thickness than the rest of the first aerodynamic skin 18.

The first spar 20 is preferably formed integrally as a single unitary member.

The first spar 20 includes a mounting portion 26. The mounting portion 26 is configured to be attached to the first aerodynamic skin 18, preferably at its first end portions 22, 24. The mounting portion 26 protrudes forward in a chordwise direction.

The mounting portion 26 may include an upper mounting leg portion 28 and a lower mounting leg portion 30. Each of the mounting leg portions 28, 30 preferably is parallel to the corresponding first end portions 22, 24.

The first spar 20 includes a first intermediate portion 32. The first intermediate portion 32 may be aligned vertically. The first intermediate portion 32 preferably connects the mounting leg portions 28, 30.

The first spar 20 includes an attachment portion 34. The attachment portion 34 is configured to be fixed to another spar.

The attachment portion 34 may include a first leg portion 36. The first leg portion 36 protrudes aft in the chordwise direction. Preferably, the attachment portion 34 comprises an upper first leg portion 38 and a lower first leg portion 40 that are spaced in the vertical direction, and may be connected by the first intermediate portion 32. Each of the first leg portions 36, 38, 40 may be tapered.

The first spar 20 includes a first spar contact surface 42. The first spar contact surface 42 is inclined. The first spar contact surface 42 is facing outward. The first spar contact surface 42 is preferably disposed on the first leg portion 36. The first spar 20 may include an upper first spar contact surface 44 and a lower first spar contact surface 46. The upper first spar contact surface 44 is preferably disposed on the upper first leg portion 38. The upper first spar contact surface 44 may face upward. The lower first spar contact surface 46 is preferably disposed on the lower first leg portion 40. The lower first spar contact surface 46 may face downward.

The first spar 20 may include a first collateral surface 48. The first collateral surface 48 is inclined. The first collateral surface 48 is facing inward. The first collateral surface 48 is preferably disposed on the first leg portion 36 opposite the first spar contact surface 42. The first spar 20 may include an upper first collateral surface 50 and a lower first collateral surface 52. The upper first collateral surface 50 is preferably disposed on the upper first leg portion 38. The upper first collateral surface 50 may face downward. The lower first collateral surface 52 is preferably disposed on the lower first leg portion 40. The lower first collateral surface 52 may face upward.

The second aerodynamic box 16 generally forms the trailing edge of the airfoil profile 10. Thus, for example, the second aerodynamic box 16 may be configured as a trailing edge box sometimes called TE box.

The second aerodynamic box 16 includes a second aerodynamic skin 54 and a second spar 56. Preferably, the second spar 56 is configured as an auxiliary spar that is facing towards front in the chordwise direction of the airfoil profile 10.

The second aerodynamic skin 54 forms the outer surface of the second aerodynamic box 16 and is configured in a known manner according to aerodynamic requirements.

The second aerodynamic skin 54 includes an upper second end portion 58 and a lower second end portion 60. The second end portions 58, 60 are preferably configured to be attached to the second spar 56.

The second spar 56 is preferably formed integrally as a single unitary member.

The second spar 56 includes a mounting portion 62. The mounting portion 62 is configured to be attached to the second aerodynamic skin 54, preferably at its second end portions 58, 60. The mounting portion 62 extends forward in a chordwise direction, but does not protrude over the second aerodynamic skin 54. The mounting portion 62 preferably is parallel to the corresponding second end portions 58, 60.

The second spar 56 includes a second intermediate portion 64. The second intermediate portion 64 may be aligned vertically.

The second spar 56 includes an attachment portion 66. The attachment portion 66 is configured to be fixed to another spar, such as the first spar 20. Furthermore, the attachment portion 66 is configured to attach to the second aerodynamic skin 54.

The attachment portion 66 may include a second leg portion 68. The second leg portion 68 extends forward in the chordwise direction, but does not protrude. Preferably, the attachment portion 66 comprises an upper second leg portion 70 and a lower second leg portion 72 that are spaced in the vertical direction, and may be connected by the second intermediate portion 64. Each of the second leg portions 68, 70, 72 may be tapered.

The second spar 56 includes a second spar contact surface 74. The second spar contact surface 74 is inclined. The second spar contact surface 74 is facing inward. The second spar contact surface 74 is preferably disposed on the second leg portion 68. The second spar 54 may include an upper second spar contact surface 76 and a lower second spar contact surface 78. The upper second spar contact surface 76 is preferably disposed on the upper second leg portion 70. The upper second spar contact surface 76 may face downward. The lower second spar contact surface 78 is preferably disposed on the lower second leg portion 72. The lower second spar contact surface 78 may face upward.

The second spar 56 may include a second collateral surface 80. The second collateral surface 80 is parallel to the second aerodynamic skin 54, preferably the second end portions 58, 60. The second collateral surface 80 is facing outward. The second collateral surface 80 is preferably disposed on the second leg portion 68 opposite the second spar contact surface 74. The second spar 56 may include an upper second collateral surface 82 and a lower second collateral surface 84. The upper second collateral surface 82 is preferably disposed on the upper second leg portion 70. The upper second collateral surface 82 may face upward and may be attached to the second aerodynamic skin 54, preferably the upper second end portion 58. The upper second collateral surface 82 is preferably parallel to the upper second end portion 58. The lower second collateral surface 84 is preferably disposed on the lower second leg portion 72. The lower second collateral surface 84 may face downward and may be attached to the second aerodynamic skin 54, preferably the lower second end portion 60. The lower second collateral surface 84 is preferably parallel to the lower second end portion 60.

Further referring to FIG. 1, a spar joint 86 is depicted. The spar joint 86 is formed by engaging the first spar 20 and the second spar 56.

Therein, the first spar contact surface 42 engages the second spar contact surface 74. Preferably, the upper first spar contact surface 44 engages the upper second spar contact surface 76. Preferably, the lower first spar contact surface 46 engages the lower second spar contact surface 78.

When the first and second contact surfaces 42, 74 are engaged, they form a contact plane 88. The contact plane 88 is inclined corresponding to the first and second contact surfaces 42, 74. The contact plane 88 defines a first imaginary plane 90 that extends the contact plane 88 at least in the chordwise direction. In addition, the extremal end of the first aerodynamic skin 18 defines a second imaginary plane 92 that is tangential thereto. The first and second imaginary planes 90, 92 form an intersection 94 that is arranged forward. As a result, the first and second contact surfaces 42, 74 are inclined such that they form the intersection 94 forward of the first and second contact surfaces 42, 74.

Correspondingly, when the upper first and second spar contact surfaces 44, 76 are engaged, an upper contact plane 96 is formed. The upper contact plane 96 defines an upper first imaginary plane 98 that extends the upper contact plane 96 at least in the chordwise direction. The upper first end portion 22 defines an upper second imaginary plane 100 that is tangential thereto. The upper first and secondary imaginary planes 98, 100 form an upper intersection 102 that is arranged forward and upward of the upper first and second spar contact surfaces 44, 76. As a result, the upper first and second contact surfaces 44, 76 are inclined such that they form the intersection 102 forward and upward of the upper first and second contact surfaces 44, 76.

Furthermore, when the lower first and second spar contact surfaces 46, 78 are engaged, a lower contact plane 104 is formed. The lower contact plane 104 defines a lower first imaginary plane 106 that extends the lower contact plane 104 at least in the chordwise direction. The lower first end portion 24 defines a lower second imaginary plane 108 that is tangential thereto. The lower first and secondary imaginary planes 106, 108 form a lower intersection 110 that is arranged forward and downward of the lower first and second spar contact surfaces 46, 78. As a result, the lower first and second contact surfaces 46, 78 are inclined such that they form the intersection 110 forward and downward of the lower first and second contact surfaces 46, 78.

In this configuration, the first spar 20 and the second spar 56 define a cavity 112 between them. Furthermore, it should be noted that the first collateral surfaces 48, 50, 52 are parallel to the respective second end portions 58, 60, when the first and second spars 20, 56 are engaged.

Each of the first and second spars 20, 56 may include a plurality of fastener openings 114 for fasteners 116 (both dashed), such as rivets.

Figure 2:
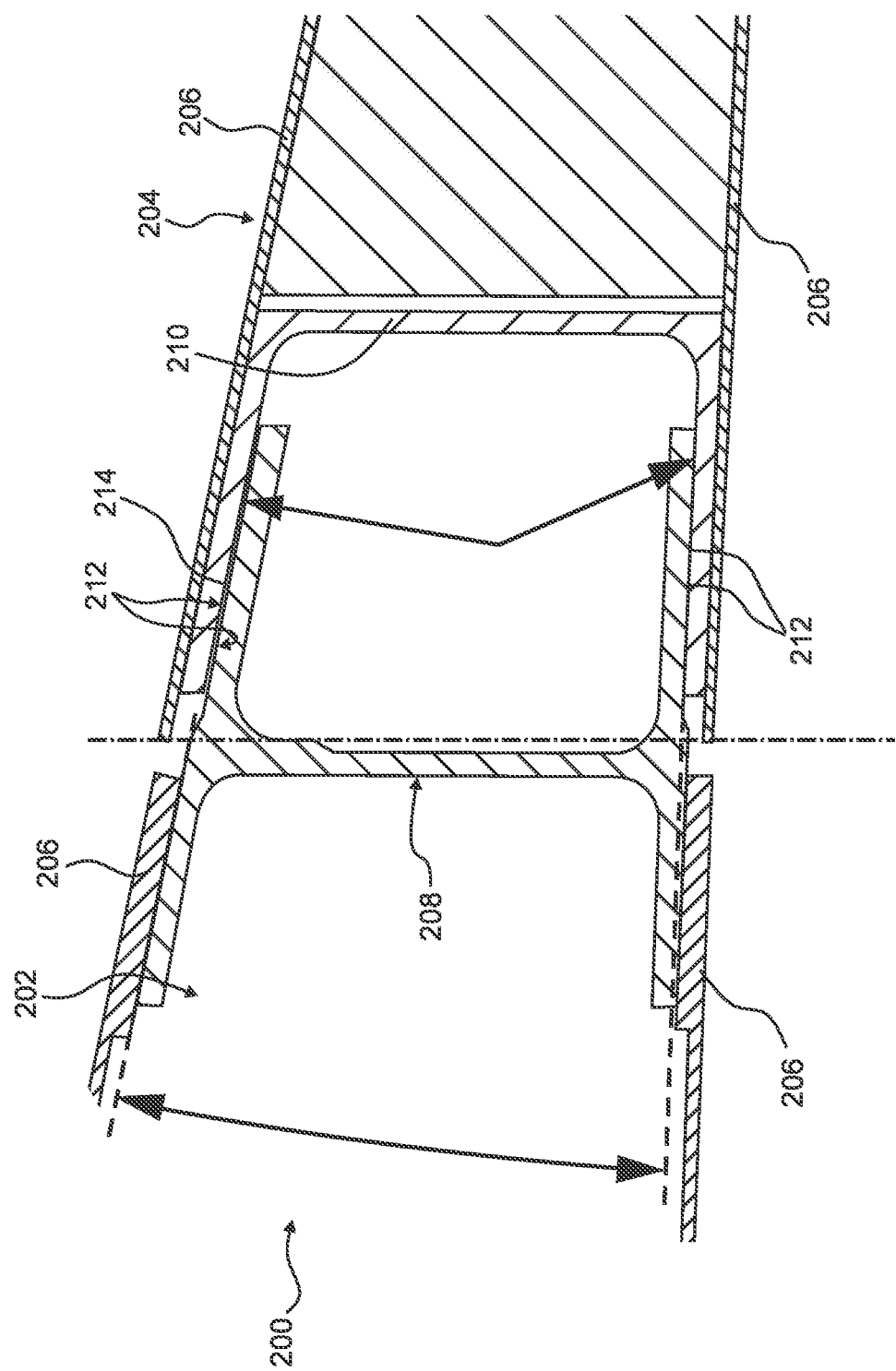
FIG. 2 partially depicts a cross-section through a conventional airfoil profile for comparison.

Referring to FIG. 2 for comparison, a conventional airfoil profile 200 includes a first box 202 and a second box 204. Each box 202, 204 has an aerodynamic skin 206. The first box 202 includes a rear spar 208 and the second box 204 includes an auxiliary spar 210. Each spar 208, 210 has attachment surfaces 212 that face each other but do not necessarily make contact. In order to bridge the gap between the attachment surfaces 212, a shim 214 may be used. In contrast to the airfoil profile 10, the attachment surfaces 212 in the conventional airfoil profile 200 are all parallel to the aerodynamic skin 206.

In order to integrate an aerodynamic box without a solid shim, a spar joint is provided. The spar joint comprises a first spar having a first spar contact surface and a second spar having a second spar contact surface. When the first and second spars are fixed to each other, the first and second contact surfaces engage each other in a manner forming a contact plane. The first and second contact surfaces are inclined in such a manner that a first imaginary plane that is an extension of the contact plane in a chordwise direction forms at least one intersection with a second imaginary plane that is originating from a chordwise extremal end of an aerodynamic skin. The spar joint is used in aerodynamic boxes, such as flap boxes and TE boxes. The spar joint is also used in airfoil profiles.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 10 airfoil profile
12 aerodynamic surface
14 first aerodynamic box
16 second aerodynamic box
18 first aerodynamic skin
20 first spar
22 upper first end portion
24 lower first end portion
26 mounting portion
28 upper mounting leg portion
30 lower mounting leg portion
32 first intermediate portion
34 attachment portion
36 first leg portion
38 upper first leg portion
40 lower first leg portion
42 first spar contact surface
44 upper first spar contact surface
46 lower first spar contact surface
48 first collateral surface
50 upper first collateral surface
52 lower first collateral surface
54 second aerodynamic skin
56 second spar
58 upper second end portion
60 lower second end portion
62 mounting portion
64 second intermediate portion
66 attachment portion
68 second leg portion
70 upper second leg portion
72 lower second leg portion
74 second spar contact surface
76 upper second spar contact surface
78 lower second spar contact surface
80 second collateral surface
82 upper second collateral surface
84 lower second collateral surface
86 spar joint
88 contact plane
90 first imaginary plane
92 second imaginary plane
94 intersection
96 upper contact plane
98 upper first imaginary plane
100 upper second imaginary plane
102 upper intersection
104 lower contact plane
106 lower first imaginary plane
108 lower second imaginary plane
110 lower intersection
112 cavity
114 fastener opening
116 fasteners
200 airfoil profile
202 first box
204 second box
206 aerodynamic skin
208 rear spar
210 auxiliary spar
212 attachment surfaces
214 shim

The invention claimed is:

1. A spar joint configured for joining a first aerodynamic box and a second aerodynamic box so as to form an airfoil profile of an aircraft, the first aerodynamic box having a first aerodynamic skin, the second aerodynamic box having a second aerodynamic skin, wherein the spar joint comprises:
a first spar having a first intermediate portion and a first attachment portion with at least one first spar contact surface; and
a second spar having a second intermediate portion and a second attachment portion with at least one second spar contact surface, wherein the first and second spars are fixed to each other, and the first and second spar contact surfaces engage each other in a manner forming a contact plane,
wherein the first attachment portion extends from the first intermediate portion toward the second aerodynamic box, and the second attachment portion extends from the second intermediate portion toward the first aerodynamic box, and
wherein the first and second spar contact surfaces are inclined such that a first imaginary plane that is an extension of the contact plane in a chordwise direction forms at least one intersection with a second imaginary plane that is originating from at least one of a chordwise extremal end of the first aerodynamic skin and the second aerodynamic skin.

2. The spar joint according to claim 1, wherein the first and second spar contact surfaces are inclined such that the intersection is positioned further outward relative to a position of the first and second spar contact surfaces.

3. The spar joint according to claim 1, wherein the first and second spar contact surfaces are inclined such that the intersection is positioned further forward relative to a position of the first and second spar contact surfaces.

4. The spar joint according to claim 1, wherein at least one of
the first spar contact surface is inclined towards aft in the chordwise direction or
the second spar contact surface is inclined towards front in the chordwise direction.

5. The spar joint according to claim 1,
wherein the first spar includes an upper first spar contact surface that is facing upward and a lower first spar contact surface that is facing downward,
wherein the upper first spar contact surface and the lower first spar contact surface are inclined towards aft in the chordwise direction.

6. The spar joint according to claim 1,
wherein the second spar includes an upper second spar contact surface that is facing downward and a lower second spar contact surface that is facing upward,
wherein the upper second spar contact surface and the lower second spar contact surface are inclined towards front in the chordwise direction.

7. The spar joint according to claim 1, wherein the first spar includes at least one first leg portion that is protruding towards aft in the chordwise direction and the first spar contact surface is disposed on the first leg portion.

8. The spar joint according to claim 1, wherein the second spar includes at least one second leg portion that is protruding towards aft in the chordwise direction and the second spar contact surface is disposed on the second leg portion.

9. The spar joint according to claim 1, wherein at least one of
the first spar includes upper and lower first leg portions which extend towards aft in the chordwise direction, the first intermediate portion being integrally formed with the upper and lower first leg portions, and arranged to be vertical, or
the second spar includes upper and lower second leg portions which extend towards aft in the chordwise direction, the second intermediate portion being integrally formed with the upper and lower second leg portions, and arranged to be vertical.

10. The spar joint according to claim 1, wherein the first spar and the second spar define a cavity therebetween.

11. The spar joint according to claim 1, wherein the first spar includes at least one first collateral surface that is facing inward and is inclined such that, when the first and second spars are fixed to each other, the first collateral surface is parallel to the second aerodynamic skin arranged opposite of the first collateral surface.

12. The spar joint according to claim 1, wherein the second spar includes at least one second collateral surface that is facing outward and is configured such that, when the first and second spars are fixed to each other, the second collateral surface is facing towards and parallel to the second aerodynamic skin.

13. The spar joint according to claim 9, wherein at least one of the first leg portions or the second leg portions has a taper, and the taper is defined by the surfaces disposed on the respective leg portion.

14. The spar joint according to claim 1, wherein the first and second spars each comprise a fastener opening formed in the respective leg portions, the fastener opening configured for accommodating a fastener, so as to fix the first and second spars to each other.

15. An aerodynamic box configured to form an airfoil profile of an aircraft, the aerodynamic box comprising:
an aerodynamic skin, and
a spar having a mounting portion, an attachment portion, and a first intermediate portion arranged to be vertical, the attachment portion having at least one spar contact surface configured for engaging another spar,
wherein the mounting portion extends from the intermediate portion towards front in a chordwise direction, and the attachment portion extends from the from the intermediate portion towards aft in the chordwise direction; and
wherein the spar contact surface is inclined such that a first imaginary plane that is an extension of the spar contact surface in the chordwise direction forms at least one intersection with a second imaginary plane that is originating from a chordwise extremal end of the aerodynamic skin.

16. An airfoil profile configured for forming an aerodynamic surface of an aircraft, the airfoil profile comprising an airfoil box and a trailing edge box that are attachable to each other by means of a spar joint according to claim 1.

17. An airfoil profile configured for forming an aerodynamic surface of an aircraft, the airfoil profile comprising an airfoil box and a trailing edge box that are each formed as an aerodynamic box according to claim 15.

18. A spar joint configured for joining a first aerodynamic box and a second aerodynamic box so as to form an airfoil profile of an aircraft, the first aerodynamic box having a first aerodynamic skin, the second aerodynamic box having a second aerodynamic skin, wherein the spar joint comprises:
a first spar having at least one first spar contact surface configured to engage another spar contact surface;
a second spar having at least one second spar contact surface configured such that, when the first and second spars are fixed to each other, the first and second spar contact surfaces engage each other in a manner forming a contact plane, wherein the first and second spar contact surfaces are inclined such that a first imaginary plane that is an extension of the contact plane in a chordwise direction forms at least one intersection with a second imaginary plane that is originating from at least one of a chordwise extremal end of the first aerodynamic skin or the second aerodynamic skin;

wherein the first and second spar contact surfaces are inclined such that the intersection is positioned further forward relative to a position of the first and second spar contact surfaces.

\* \* \* \* \*